No. 607,770. Patented July 19, 1898.
W. J. RUFF.
APPARATUS FOR PASTEURIZING BEER.
(Application filed June 5, 1897.)
(No Model.)
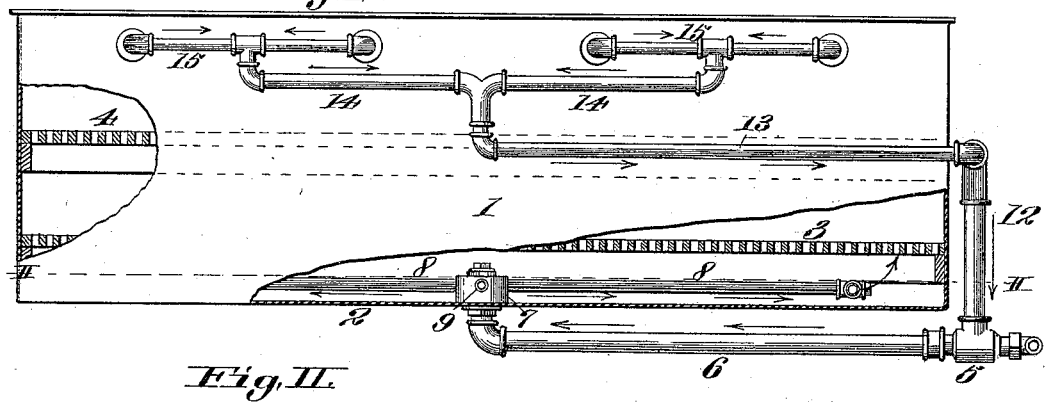
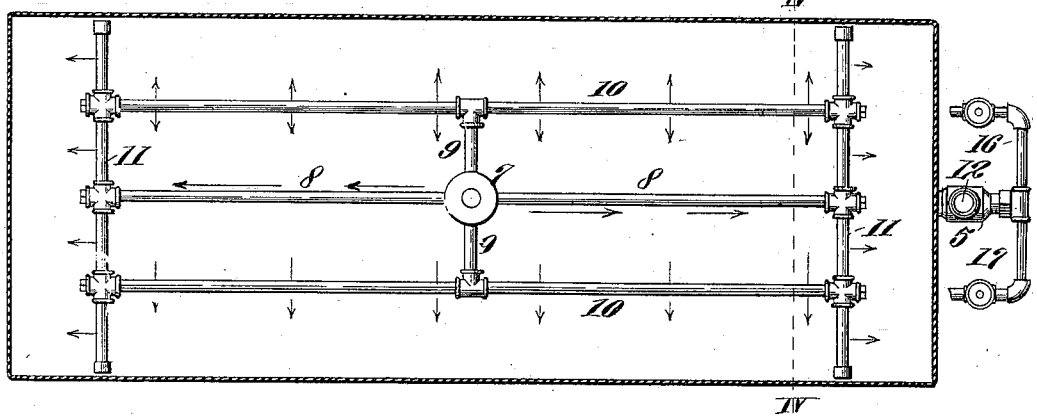
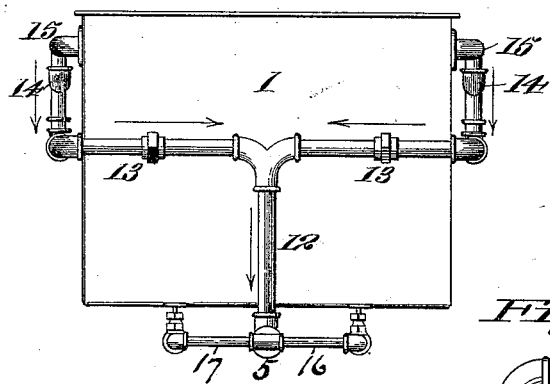
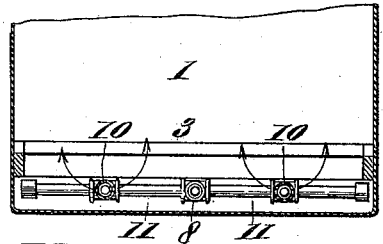
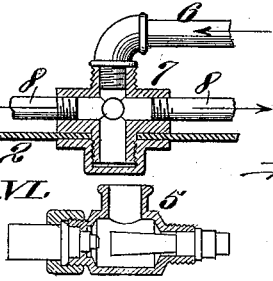
Attest:
H. Finley.
C. C. Moore.
Inventor;
William J. Ruff
By Knight Bro'
Atty's

UNITED STATES PATENT OFFICE.

WILLIAM J. RUFF, OF QUINCY, ILLINOIS.

APPARATUS FOR PASTEURIZING BEER.

SPECIFICATION forming part of Letters Patent No. 607,770, dated July 19, 1898.

Application filed June 5, 1897. Serial No. 639,581. (No model.)

*To all whom it may concern:*

Be it known that I, WILLIAM J. RUFF, a citizen of the United States, residing at Quincy, Adams county, State of Illinois, have invented a certain new and useful Improvement in Apparatus for Pasteurizing Beer, of which the following is a full, clear, and exact description, reference being had to the accompanying drawings, forming part of this specification.

My invention has for its object an improved apparatus to be utilized in pasteurizing beer, whereby the operation is more perfectly carried out and the beer more effectually and uniformly treated and its chemical properties preserved.

The manufacture of beer is based upon many material changes, many of which are of a chemical nature, both in the raw material employed and in the product itself. The barley by proper manipulation becomes malt to properly fit it for brewing, as the starch is put in a condition for saccharification by being exposed to diastatic action at proper temperatures, which converts the starch into sugar and dextrin, the latter being a by-product of starch. The albuminoids are in part extracted and in part remain unchanged in the beer. The albuminoids and the dextrin which remain unchanged in the beer impart fullness of taste and body to the beer and are considered the nutritive qualities of the beer. During fermentation the sugar is converted into alcohol and carbonic-acid gas. Some forms of albumen are absorbed by the yeast, while others remain unchanged (in solution) in the beer, as stated above.

When beer is ready for market and it is intended to preserve it for a long-distance shipment or where the same will be used slowly, it is customary to accomplish this to use chemical preservatives or to sterilize the beer by means of heat. This latter is commonly termed "pasteurization" of beer, and is the method usually employed, as the beer is more healthful than where chemical preservatives are used; but there are also objections to this method, notably the secretions of albumen from the soluble to the insoluble form, which greatly impairs the nutritive quality of the beer. This change, which is of a chemical nature, is the result of exposing the beer to heat, and is also proportionate to the length of time the beer is exposed to the heat. It is therefore important to rapidly heat the beer and to rapidly cool it after it has been sufficiently heated, as the rapid heating shortens the duration of the process and the rapid cooling removes the beer in a few moments from the hurtful effects of the heat, which are the secretions of albumen, losses of the highly-expanded carbonic-acid gas, and the volatile alcohol contained in the beer through the pores of the cork. Rapid cooling condenses the gas, which, with the alcohol, is reabsorbed and retained by the beer.

It has heretofore been the practice to heat the beer by introducing steam or hot water into the tank containing the bottles immersed in cold water, and this process is necessarily slow, because if the steam or hot water is introduced too fast the bottles will break under the sudden change of temperature. After the beer has been heated sufficiently it has been the practice heretofore to allow the bottles to stand in the hot water, and the only efforts to reduce this temperature and avoid the chemical changes referred to have been, so far as my knowledge goes, an attempt to cool the beer by the introduction of cold water to the tank. This method of cooling is also necessarily very slow for the reason that if cold water is admitted otherwise than very slowly to the tank the bottles will be broken, and this method, therefore, requires considerable time to cool the bottles, and the beer thus remains hot for a long time and secretions occur and also the loss of expanded gas and alcohol, and the action of the hot water on the corks makes them spongy and extracts tannic acid therefrom, which percolates into the beer, and this being a reagent for albumen makes the beer turbid, and thus it will be seen that chemical actions are directly involved, both in the time consumed in heating the beer and the time consumed in cooling it. With my improved apparatus, which is hereinafter described, and pointed out in the claims, I heat the beer by introducing water of gradually-increasing temperature, which can be done rapidly without danger of breaking the bottles, and I cool the beer by water of gradually-decreasing temperature, usually in ten or fifteen minutes, thus gradually yet rapidly and effectually reducing the chances of changes occurring in the beer and retaining the chemical properties in the beer, and it remains more healthful, has more nutritive and stimulating qualities, and has all the characteristics of fresh keg-beer and there are absent the usual secretions deposited out of coagulated albumen, and by preventing these secretions the beer remains almost unchanged and is only effected during the time actually necessary to expose it to sufficient heat to insure stability.

Referring to the drawings, Figure I is a side view, part in vertical section and illustrative of my improved apparatus. Fig. II is a horizontal section taken on line II II, Fig. I. Fig. III is an end view. Fig. IV is a detail vertical section taken on line IV IV, Fig. II. Fig. V is an enlarged detail view, part in section and part in elevation and showing a modification. Fig. VI is a sectional view of the jet-pump.

1 represents a tank having a closed bottom 2, above which is a perforated false bottom or partition 3. About midway of the height of the tank there is also preferably placed a perforated partition 4. The bottles are placed on the partitions 3 and 4. 5 represents a jet-pump, which may be of any well-known form or type. (See Fig. VI.) 6 is an eduction-pipe leading from the pump to the center of the bottom of the tank, through which it extends. This pipe connects with a head 7, located within the tank beneath the false bottom 3. Communicating with this head 7 are longitudinal imperforate feed-pipes 8 and transverse imperforate feed-pipes 9. The pipes 9 communicate with longitudinal perforated distributing-pipes 10, and at the ends of the pipes 10 and the pipes 8 are transverse perforated distributing-pipes 11. The perforations in the pipes 10 are preferably in each side thereof, so that the water will escape in both directions from these pipes, as indicated by the arrows, Figs. II and IV, and the perforations in the pipes 11 are preferably made in the outer sides thereof, so that the water will escape toward the end of the tank, as shown by the arrows in Fig. II, and I thus obtain an even and uniform distribution of the water.

12 represents a pipe connecting with the suction side of the pump 5. This pipe has branches 13 extending to the right and left, as shown in Fig. II, and which project around the sides of the tank, preferably about to the center thereof, as shown in Fig. I. These pipes 13 have extensions 14 leading to the right and to the left and communicating with pipes 15, that communicate with the interior of the tank.

16 represents a steam-pipe, and 17 a water-pipe connecting with the pump 5.

In operation the bottles are placed in the tank on the partitions 3 and 4, and the tank is then filled with water up to the height or a little above the line of the pipes 15, the various pipes referred to being filled with water passing from the tank. Steam is now turned on by opening the valve in pipe 16, and it creates a circulation of water through the pipes and the tank, as indicated by the arrows, the water being gradually heated outside the tank and the circulation being kept up at a rapid rate, preferably at the rate of about sixty gallons per minute. This is continued until shortly before the final maximum temperature contemplated in pasteurizing processes is reached at the top of the tank, and the steam is then turned off. The reason for turning off the steam before the temperature of the water at the top of the tank indicates the final temperature desired is because heat naturally rises and the water being some degrees warmer at the bottom of the tank the temperature will diffuse itself equally throughout the tank, so that when the steam is turned off the water at the top of the tank will continue to increase in temperature, and hence the desirability of turning off the steam shortly before the water at the top of the tank indicates the temperature finally desired. After the steam has been turned off for some time the temperature of the water will fall, partly owing to contact with the surrounding atmosphere and partly owing to the beer in the center of the bottles being still cooler than that adjacent to the walls of the bottles. The steam is therefore turned on again after a lapse of a few minutes and the temperature brought up to the desired point, and this is repeated until there is no more perceptible falling off of the temperature. Not more than one-half of an hour to three-quarters of an hour ought to be consumed for this purpose. The apparatus is now allowed to stand for about one hour, so that the beer in the bottles is uniformly heated throughout and all germs destroyed, and the cooling process is then started, and to fully preserve the chemical properties of the beer this also must be done as speedily as possible. This with my improved apparatus can be accomplished very rapidly, within ten or fifteen minutes, and thus the chemical properties of the beer be preserved, as explained. To cool the beer, the jet-pump is started by turning on cold water in pipe 17. The pump now draws the hot water from the tank through the suction-pipe and its branches and mixes it with the cold water, by which it is moderated, and this water is forced through the pipe 6 at the bottom of the tank. The flow is kept up, additional cold water being turned on, if necessary, until the beer in the bottles has cooled to a proper temperature, and the bottles may then be removed. The mixing of the cold water with the hot water taking place outside of the tank causes the former to be moderated by the latter before it reaches the tank, and thus the bottles and the beer are gradually cooled down without danger of the bottles being broken, whereas, if cold water were admitted by itself to the tank the bottles would be broken, and thus it will be observed how the chemical properties in the beer may be maintained by the use of my improved method and which would be to a great extent lost, as explained, if the beer were allowed to stand until it cooled off by the natural escape of heat.

The foregoing has been demonstrated by practical experience in the use of my method and apparatus.

By providing the feed and distributing pipes in the bottom of the tank, as shown and explained, there is an even distribution of the water at the bottom of the tank, and providing the suction-pipe 12 with the pipes communicating therewith and with the top of the tank the water is taken from the tank evenly during the process of circulation.

If desired, the pipe 6 may pass through the tank from one end or side to the head 7, as shown in Fig. V, and this I prefer in many cases, as the water surrounding said pipe 6 and the imperforate pipes still further moderates the temperature of the incoming water during the cooling process and also condenses the steam and attemperates the water during the heating period.

While I prefer and while my improvement is most effectually carried out by both heating the beer by water of gradually-increasing temperature and cooling it by water of gradually-decreasing temperature, still my invention may in a measure be carried out by heating the beer by the use of water of gradually-increasing temperature and then cooling the beer in the old way or by heating the beer in the old way and then cooling it by the use of water of gradually-decreasing temperature, as in either instance the duration of the pasteurizing process will be shortened, and the chemical and alcoholic properties of the beer will be preserved to the extent that my improvement is used.

I claim as my invention—

1. An apparatus for pasteurizing bottled liquids comprising a tank adapted to receive the bottled liquid to be treated, means for circulating water through said tank, and means located outside of the tank for commingling a heating or a cooling liquid with the water, as it passes from and to the tank, for changing the temperature of the water before it is introduced into the tank; whereby the temperature of the bottled liquid to be treated is raised and lowered by constantly replacing the tank-contained water by water of changed temperature until the desired temperature within the tank is reached for both heating and cooling the beer; substantially as described.

2. In an apparatus for pasteurizing beer, the combination of a tank for containing water, a perforated partition within the tank for supporting the bottles, a jet-pump, suction-pipe connecting with the jet-pump and having branches communicating with the upper part of said tank, an eduction-pipe connected to the jet-pump and extending to the bottom of the tank, and steam and cold-water pipes connecting with said pump, substantially as set forth.

3. In an apparatus for pasteurizing beer, the combination of a tank for containing water, a perforated partition within the tank for supporting the bottles, a jet-pump, a suction-pipe connecting with the jet-pump, and having branches communicating with the upper part of said tank, an eduction-pipe connected to the jet-pump and extending to the bottom of the tank, distributing-pipes located within the tank at the bottom thereof and communicating with said eduction-pipe, and steam and cold-water pipes connecting with said pump, substantially as set forth.

4. In an apparatus for pasteurizing beer, the combination of a tank containing water, a perforated partition within the tank for supporting the bottles, a jet-pump, a suction-pipe connecting with the jet-pump and having branches communicating with the upper part of said tank, an eduction-pipe connected to the jet-pump and extending to the bottom of the tank, feed-pipes 8 and 9, and distributing-pipes 10 and 11 located within the tank at the bottom thereof and communicating with said eduction-pipe, and steam and water pipes connecting with said pump, substantially as set forth.

5. In an apparatus for pasteurizing beer, the combination of a tank for containing water, a perforated partition within the tank for supporting the bottles, a jet-pump, a suction-pipe connecting with the jet-pump, and communicating with the upper part of the tank through means of pipes 13, 14 and 15, an eduction-pipe connected to the jet-pump and extending to the bottom of the tank, feed-pipes 8 and 9, and distributing-pipes 10 and 11 located within the tank at the bottom thereof and communicating with the said eduction-pipe, and steam and cold-water pipes connecting with said pump, substantially as set forth.

WILLIAM J. RUFF.

In presence of—
GERHARD G. ARENDS, Jr.,
J. H. DUKER.